United States Patent [19]

Matsushita et al.

[11] Patent Number: 5,198,933
[45] Date of Patent: Mar. 30, 1993

[54] RECORDING MEDIUM EMERGENCY RELEASE MECHANISM

[75] Inventors: Hiroshi Matsushita, Atsugi; Koichiro Nanke, Fujisawa; Kouji Takahashi, Sagamihara, all of Japan

[73] Assignee: International Business Machines Corporation, Armonk, N.Y.

[21] Appl. No.: 666,166

[22] Filed: Mar. 7, 1991

[30] Foreign Application Priority Data

Mar. 27, 1990 [JP] Japan ................................ 2-75794

[51] Int. Cl.[5] .......................................... G11B 17/022
[52] U.S. Cl. .................................................. 360/99.06
[58] Field of Search ............... 360/99.06, 99.02, 99.07, 360/99.03

[56] References Cited

U.S. PATENT DOCUMENTS 4,670,802 6/1987 Ogawa et al. ................. 360/99.03

FOREIGN PATENT DOCUMENTS 59-96559 6/1984 Japan .
9210562 11/1984 Japan .
62-31061 2/1987 Japan .

Primary Examiner—Robert S. Tupper
Attorney, Agent, or Firm—Manny W. Schecter

[57] ABSTRACT

The invention is an information reproduction apparatus provided with supporting means for supporting a recording medium, a drive source for moving the recording medium between the initial insertion position and the reproduction position by driving said supporting means, transmission means for transmitting the driving force of said drive source to said supporting means, retraction means operable to force a transmission element to retract from said transmission means, said transmission element being a part of said transmission means, and motion means operable to force the recording medium to move from the reproduction position to the initial insertion position under the condition that said transmission element is not engaged in said transmission means. In forcibly moving said supporting means, when the drive is out of operation, said supporting means are released from the drive force by means of said retraction means, freeing the supporting means from the resistance force of the drive force.

9 Claims, 3 Drawing Sheets

RECORDING MEDIUM EMERGENCY RELEASE MECHANISM

FIELD OF THE INVENTION

The present invention relates to an information reproduction apparatus and more particularly, pertains to an improvement in the structure adapted for removing a recording medium which has been placed into an information reproducing device, when it has become inoperative, for example when the power supply for a drive in the information reproducing device (in which loading-/unloading of such a recording medium as a disk cartridge, etc., is performed, using such a drive as a motor, etc.) has failed, etc.

RELATED ART

There are known structures for removing a recording medium which has been placed into an information reproducing device in which loading/unloading of the recording medium is performed using such a drive as a motor, etc.

For example, Japanese Published Unexamined Patent Application (PUPA) No. 59-96559 describes a magnetic disk device which permits the recording medium therein to be taken out by enabling forcible turning of one of the gears that transmit the driving force of a motor by use of a screwdriver inserted into said reproducing device through a small hole bored in its front panel. Also, Japanese PUPA No. 59-210562 describes a magnetic disk device in which a ratchet specially installed therein is repetitively pushed by inserting the tip of a ball pen, etc., through a small hole bored in its front panel, to make it possible to turn little by little a cam disk for transmitting the driving force of a motor by means of the aforementioned ratchet, thereby enabling the recording medium to be taken out.

However, these devices are of such a type that the motor which is in an inoperative state must be forcibly turned, thus requiring enormous force in order to remove the recording medium. If the output from the drive is transmitted through a worm gear, this operation would require an effort to turn the worm gear with another gear; thus, the attempt to turn the motor itself is impossible.

Japanese PUPA No. 62-31061 describes an invention in which a pin or the like is inserted into the device through a small hole bored in its front panel, to forcibly move the mechanism for moving the floppy disk held therein, thereby enabling the floppy disk to be taken out. The motor and the aforementioned moving mechanism are coupled with an idle motion, so that the motor which is in an inoperative state need not be forcibly turned so far as this idle motion, thereby making it possible to take out the recording medium without requiring enormous force.

However, such a device, which has an idle motion permanently provided between the motor and the moving mechanism, is objectionable in that the loading/unloading operation of the floppy disk in normal operations is sluggish.

SUMMARY OF THE INVENTION

The object of this invention is to provide an information reproduction apparatus which obviates the need of using enormous force in taking out the recording medium, when such a drive as a motor or the like is out of operation, and which does not retard the loading/unloading operation of the recording medium, when it is normally driven.

For the purpose of attaining said objects, the information reproduction apparatus of this invention is provided with supporting means for supporting a recording medium, a drive source for moving the recording medium between the initial insertion position and the reproduction position by driving said supporting means, transmission means for transmitting the driving force of said drive source to said supporting means, retraction means operable to force a transmission element to retract from said transmission means, said transmission element being a part of said transmission means, and motion means operable to force the recording medium to move from the reproduction position to the initial insertion position under the condition that said transmission element is not engaged in said transmission means. In forcibly moving said supporting means, when the drive is out of operation, said supporting means are released from the drive force by means of said retraction means, thereby freeing the supporting means from the resistance force of the drive force. However, under normal operation, the said transmission element is returned to the said driving force transmitting path, thereby stopping inconvenience to the operation.

DETAILED DESCRIPTION OF THE PREFERRED EMBODIMENT

In the following, an embodiment of this invention will be explained in conjunction with the accompanying drawings.

Figure 1:
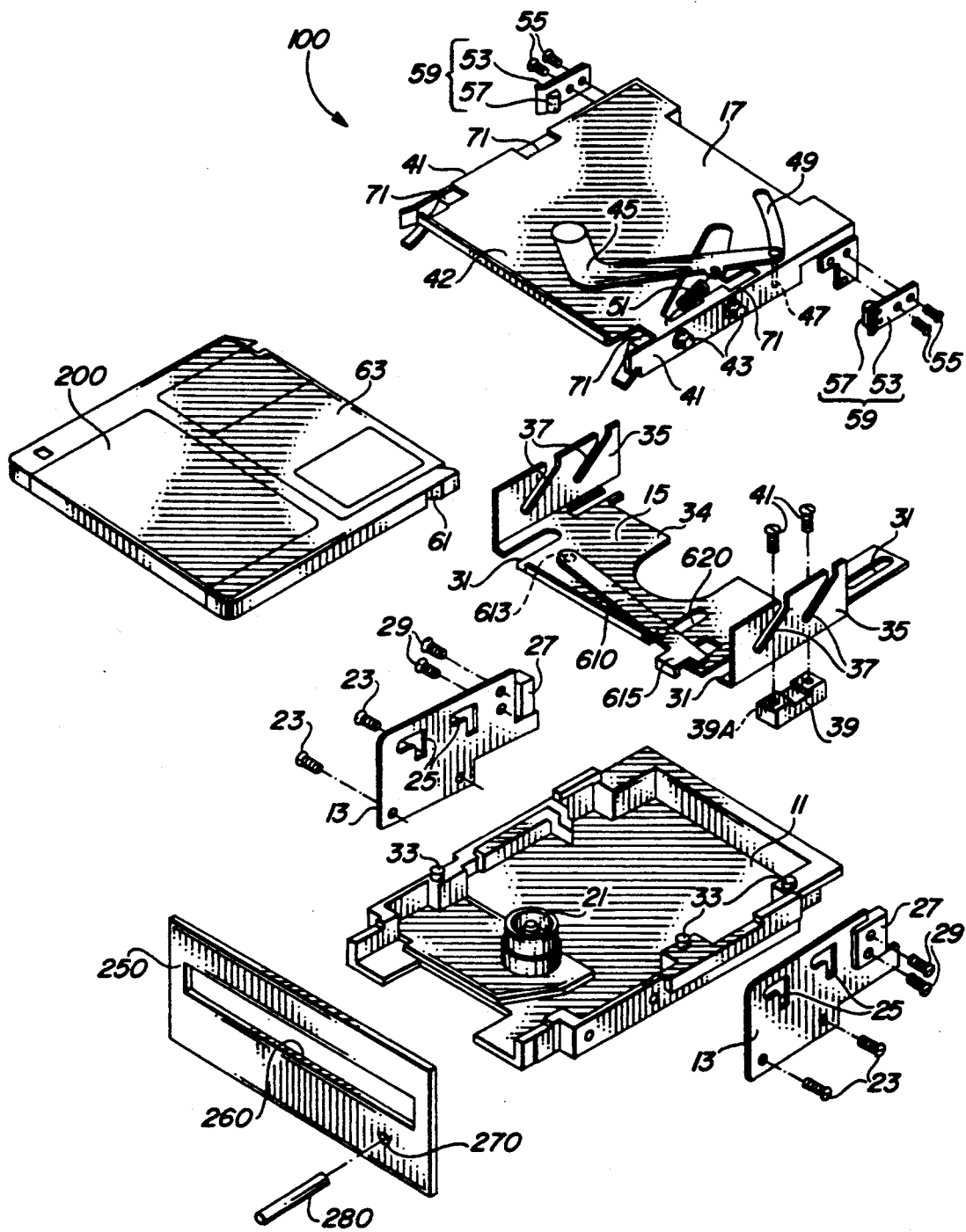
FIG. 1 is an exploded perspective view showing one embodiment of the information reproduction apparatus of this invention.

FIG. 1 shows an exploded perspective view of supporting means 100 of an information reproduction apparatus according to the invention. In the figure, the supporting means 100 has a base 11, a pair of guide plates 13, a slider bracket 15 and an upper bracket 17.

The base 11 is formed, for example, substantially in a shallow tray shape along the direction of insertion of the recording medium (disk cartridge, etc.) and has a spindle motor installed on the bottom of the base 11. As described later, the state of the recording medium 200 being coupled with a spindle motor 21 represents the reproduction position of the recording medium 200.

To each of the outside surfaces of both side walls of the base 11, a guide plate 13 is held firmly in place with screws 23. Both guide plates 13 are affixed to the base 11 parallel to each other and perpendicular to its bottom. In each guide plate 13, inverse L shape slots 25 are opened in a plurality of positions at a specified horizontal distance from each other. Further, at the rear end of the guide plate 13, an unlatching block 27 is attached with screws 29.

Between both guide plates 13, a slider bracket 15 is arranged. The slider bracket 15 is supported in a slidable manner on the top surface of the base 11. Through the bottom 34 of the slider bracket 15, a plurality of long slots 31 are opened; in conjunction, on the top of the base 11, a plurality of guide bosses 33 to be inserted through these long slots are projected therefrom. With the long slots 31 extending along the direction of insertion of the recording medium 200, the slider bracket 15 is guided in a slidable manner by the guide bosses along the aforementioned insertion direction. The slider bracket 15 has perpendicular parts 35 on both of its sides, these perpendicular parts 35 being arranged parallel to the guide plates 13 and adjacent to the inside surfaces thereof.

Through each of the perpendicular parts 35, a plurality of inclined slots 37 are opened, these inclined slots 37 being upwardly sloped along the insertion direction from the forward side of the device (inserting port 260 side) toward its inner side. On the bottom 34 of the slider bracket 15, a rack 39 is secured in place with screws 41, with a rack gear 39A formed on the perpendicular side surface on its back side, as seen in the drawings.

The upper bracket 17 is formed as a plate of almost square shape being bent downward at both side edges, to have a U-shaped section. Both of the side edges 41 of the U-shaped section face each other, such that the recording medium 200 may be held on the underside of the upper bracket 17. Pins 43 are protruded from the outside surfaces of the side edges 41, the pins 43 being so arranged as to be inserted through the inclined slots 37 and the inverse L shape slots 25. Accordingly, when the slider bracket 15 slides forward and backward along the insertion direction of the recording medium 200, the upper bracket moves in coordination with it along the inverse L shape slot 25, tracing out a locus of the inverse L shape.

On the horizontal part 42 of the upper bracket 17, a shutter driving arm 45 is rotatably mounted. From the rotating end of the shutter driving arm 45, a shutter driving pin 47 is projected perpendicularly downward, the shutter driving pin 47 being arranged to move in and along an arc shape slot 49, while projecting downward through the arc shape slot 49 in the horizontal part 42. The shutter driving arm 45 is urged by a spring 51 in such a direction that its rotating end is turned to the forward side, as seen in the insertion direction of the recording medium 200. This mechanism is such that as the recording medium 200 starts to be inserted into the upper bracket 17 (between U-shaped side edges 41), the shutter driving pin 47 comes to abut on the right end part, as seen in the drawing, of the front edge of the shutter 63 of the recording medium 200 at a specified insertion depth midway in its inserting process, then, as the recording medium 200 comes on being inserted still further, the shutter driving pin 47 forces the shutter 63 to slide leftward, as seen in this drawing, such that when the recording medium 200 is brought sufficiently deep into the inner part of the bracket, the shutter is fully opened.

At a specified position toward the inner end of each U-shaped side edge 41 of the upper bracket 17, a latch spring 53 with a latching protrusion 57 provided at its tip is attached with screws 55. Thus a latch assembly 59 for latching the recording medium 200 is comprised of the latch spring 53 and the latching protrusion 57. Notches 61 are formed on both sides of the recording medium 200 toward its inserting front, so that as the recording medium 200 is inserted into the upper bracket to a specified depth, the latching protrusions are forced into the notches 61, thereby latching the recording medium 200 to the upper bracket 17, while the shutter is kept opened.

Further, on the horizontal part 42 of the upper bracket 17, a plurality of plate springs 71 are attached, with which to press downward the recording medium 200 held by the U-shaped side edges 41, thereby suppressing play of the recording medium 200 inside the upper bracket.

Through the front panel 250, an insertion port 260 is opened, through which the recording medium 200 is to be inserted into the information reproducing device, or inside the upper bracket 17. Near to the insertion port 260, a through-hole 270 is formed, through which an operation rod 280 in the form of a pin, clip or a screwdriver, etc., is to be thrusted inward through the front panel 250.

Figure 2A:
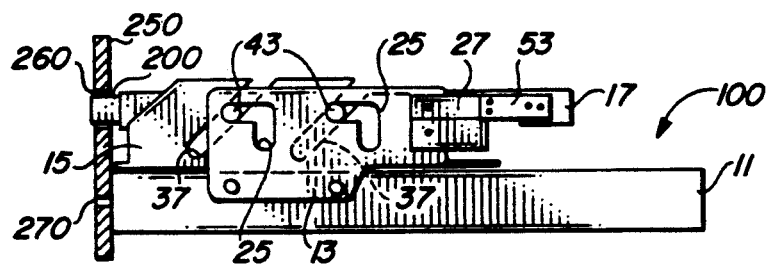
FIGS. 2 (A), (B) and (C) are side views showing the different operation states of the above embodiment.
Figure 2B:
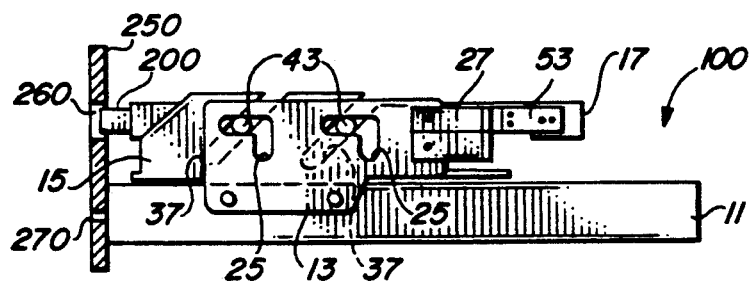
Figure 2C:
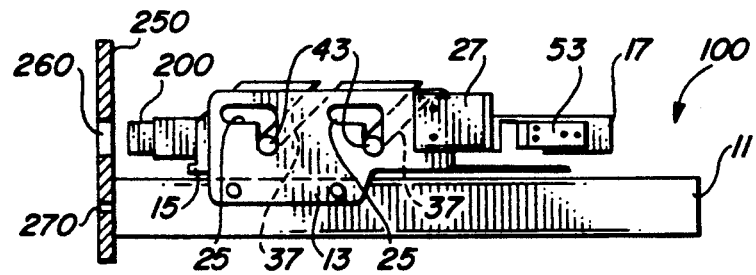

The operation of the support 100 will now be described with reference to FIG. 2. As shown in FIG. 2 (A), in the initial state (the state before the recording medium 200 has been inserted into the information reproduction apparatus), the upper bracket 17 of the support 100 is arranged at a position nearest to the inserting port 260 of the front panel 250. At this time, each of the pins is located at one end (an end toward the insertion port 260) of the horizontal part of the inverse L shape slot 25 and the slider bracket 15 is arranged at the nearest position to the insertion port 260 that it obtains in its entire stroke. The position of the recording medium 200, when inserted into the upper bracket 17 held in this position, is the initial insertion position.

When the upper bracket 17 is in this position, the forward end of the latch spring 53 rides on the unlatching block 27, thereby being pushed and bent back away from the recording medium 200; therefore, the latching protrusion 57 at the forward end of the latch spring 53 is not forced into the notch 61 of the recording medium 200, thus leaving the recording medium 200 released from the latch assembly 59. Accordingly, in the case when the upper bracket 17 does not move from this position, as when the drive 300 is out of operation (as in the power off state), even if the recording medium 200 is inserted into the inner part of the upper bracket 17, it will be returned to the front (outer) side of the insertion port 260 after releasing of the hand, due to the force of the spring 51.

As the recording medium 200 is inserted deep into the inner part of the upper bracket which is in the state shown in FIG. 2 (A), the front edge of the recording medium 200 brings a microswitch not shown in this drawing into operation, whereby the drive 300 later described is started and its driving force is transmitted to the slider bracket 15 through transmission 400 later described; then, the slider bracket 15 begins to move inward (right-ward, as seen in the drawing).

In the state (the recording medium being in its latched position) shown in FIG. 2 (B), the slider bracket 15 is slid backward (inward) a specified distance; then, the upper bracket 17 is moved backward by the specified distance, while being held at the same level as at the time of FIG. 2 (A). As a result, the forward end of the latch spring 53 is removed from the unlatching block 27; then, the latching protrusion 57 at the forward end of the latch spring 53 is forced into the notch 61, whereby the recording medium 200 is latched to the upper bracket 17 by means of the latch assembly 59. The shutter 63 of the recording medium 200 is opened by the shutter driving pin 47 in coordination with the inserting operation of the recording medium 200. However, if one releases ones hand from the recording medium 200, before the latch assembly 59 has latched the recording medium 200, the recording medium will be returned to the insertion port 260 side by the force of the spring 51. On the other hand, once the latch assembly 59 has latched the recording medium 200, the shutter 63 of the recording medium 200 is held by the upper bracket, while kept in its totally opened state.

FIG. 2 (C) shows the state in which the recording medium 200 is brought to the reproduction position. As the slider bracket 15 slides backward from the state of being at the recording medium latching position of FIG. 2 (B) to come to the most backward position in its stroke, each pin 43 of the upper bracket 17 reaches the bottom of each inverse L shape slot 25 and in coordination with this movement, the disk (not shown in this drawing) inside the recording medium 200 is mounted on the spindle motor, thereby enabling access to the disk for information.

Figure 3:
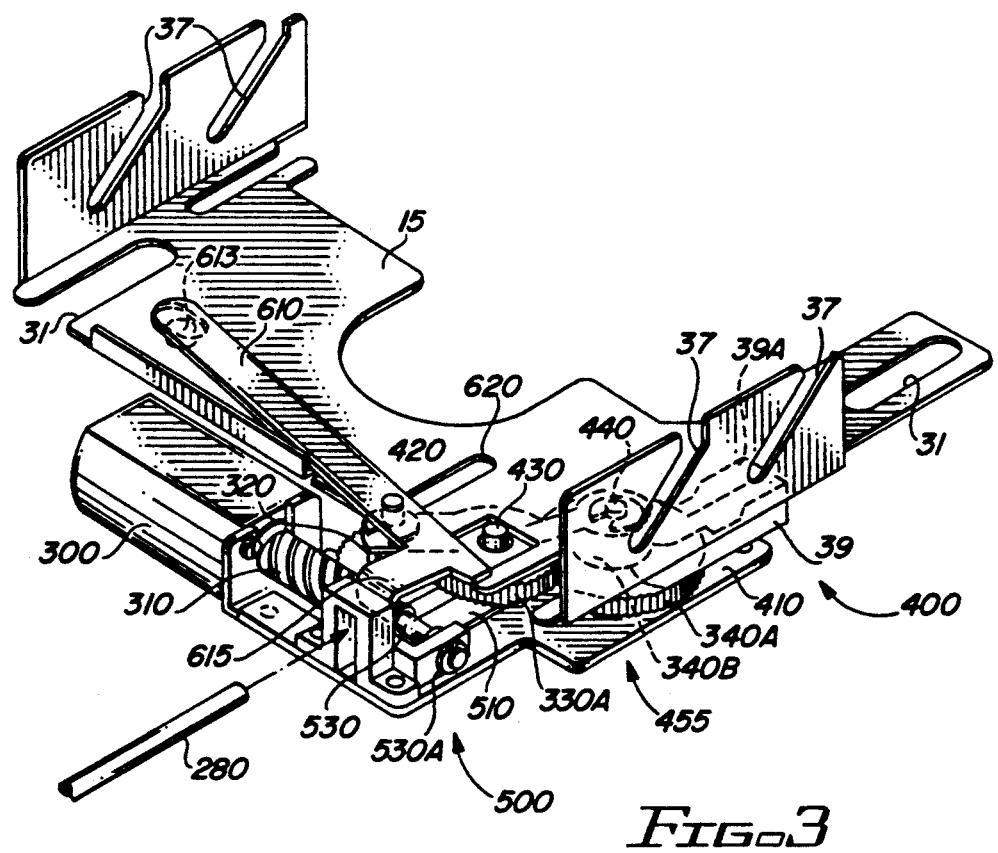
FIG. 3 is a perspective view showing the transmission means and the transmission element remover of the above embodiment.
Figure 4:
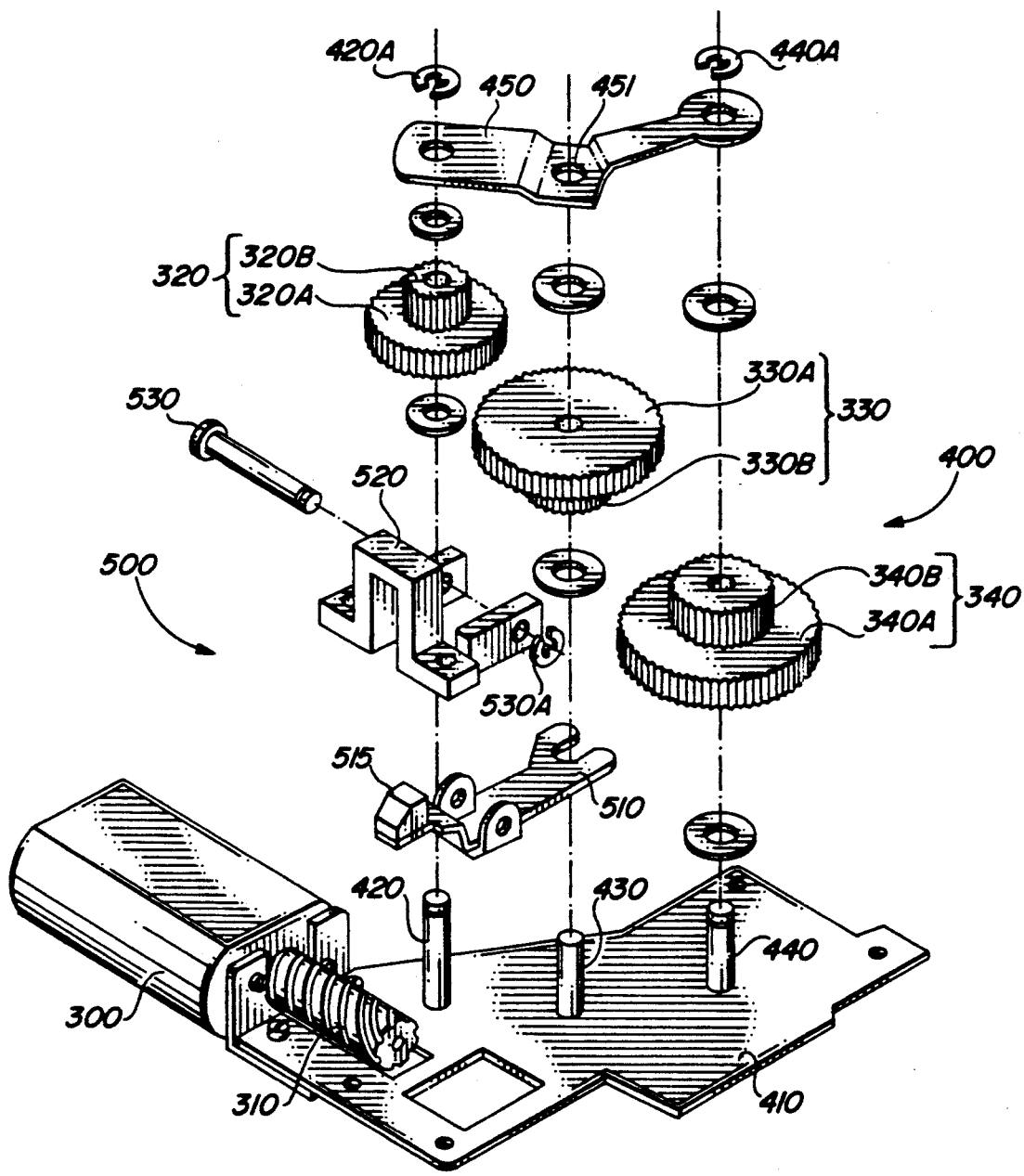
FIG. 4 is an exploded perspective view of the means of FIG. 3 partly omitted.

FIGS. 3 and 4 show the drive 300 for driving the support 100 and the transmission 400. Referring to these figures, a drive such as a motor, etc., is fixed to the base 410 of the transmission on the output shaft of the drive 300, a worm gear 310 is mounted and with the worm gear 310 the large diameter part 320A of a first gear 320 is meshed. With the small diameter part 320B of the first gear 320, is meshed the large diameter part 330A of a second gear 330; with the small diameter part 330B of the second gear 330, the large diameter part 340A of a third gear 340; and with the small diameter part 340B of the third gear 340, a rack gear 39A of a rack 39 fixed to the slider bracket 15. From the base 410 for the transmission are projected the respective shafts 420, 430 and 440 of the first, second and the third gears 320, 330 and 340. Here, a gear train 455 for transmitting the driving force of the drive 300 to the support 100 is comprised of the worm gear 310, the first, second and the third gears 320, 330 and 340 and the rack gear 39A.

To the top of the first shaft 420 and to the top of the third shaft 440, both ends of a plate spring 450 are respectively fixed with securing washers 420A and 440A. Through the insertion hole 451 opened near the center of the plate spring 450, the second shaft 430 is idly passed. The second gear 330 is removable from the gear train 455 by sliding it along the shaft 430. On the other hand, the plate spring 450 is urging the second gear 330 downward so as to return the second gear 330 to the gear train 455, after it has been removed therefrom.

Still referring to FIGS. 3 and 4, on the base 410 for the transmission, retraction means 500 is installed. The retraction means 500 has a gear removing member 510, the gear removing member 510 is swingably supported by a supporting member 520 through a pin 530 and a securing washer 530A and the supporting member 520 is fixed to the base 410 for the transmission of the driving force.

The distal end of the gear removing member 510 swings in the up - down direction in proximity to the shaft 430 and when swinging upward, abuts on the bottom of the second gear 330, to push up said gear 330 in defiance of the urging force of the plate spring 450, thereby removing it from the series of gears. To the root end of the gear removing member 510 is fixed a contact block 515 having a bevel, so that as an operation rod 280 is inserted through the through-hole 270 in the front panel 250, the tip of the operation rod 280 abuts on the contact block 515, thereby driving the retraction means 500.

As the operation rod 280 is further pushed, even after the tip of the operation rod 280 has abutted on the contact block, the bevel formed on the contact block 515 makes the gear removing member 510 swing so as to bring down its root side and to raise its distal end side thereby causing the second gear 330 to slide upward along its shaft's direction, thus effecting its removal from the gear train 455.

As shown enlarged in FIG. 3, the slider bracket 15 has a rotary arm 610 provided thereon. The rotary arm 610 is rotatably supported on the top of the first shaft 420, rotatably coupled to the slider bracket 15 through a rotary coupler 613 on one of its ends and formed with a contact part on its other end.

The mechanism is designed so that as the operation rod 280 has pushed down the contact block 515, thereby removing the second gear 330 from the gear train 455, then, the operation rod 280 will abut on the contact part 615 of the rotary arm 610. As the operation rod 280 is still further pushed in, the rotary arm 610 is turned counterclockwise, as seen in this figure, with the shaft 420 as its pivot, causing the slider bracket 15 to slide this way (insertion port 260 side). Thus the driving force provided by pushing in the operation rod 280 is transmitted to the support 100, after changing the driving direction by means of the rotary arm 610. The slider bracket 15 has a long slot 620 formed in the slider bracket, extending in its sliding direction, to allow the shaft 420 to move through the long slot 620, relatively thereto, when the slider bracket 15 is sliding.

The operation for emergency release or take-out (taking out operation when the drive 300 is out of operation) will now be described. When the drive 300 has become inoperative due to power supply trouble, etc., while the recording medium 200 is loaded in the reproduction position (the state of FIG. 2 (C)), it is impossible in this state to take out the recording medium 200 through the insertion port 260. Then an operation rod 280 in the form of a clip or a screwdriver, etc., which is readily available, is inserted into the device through the through-hole 270. The tip of the operation rod 280, after abutting on the contact part 515 of the gear removing member 510, thereby pushing down the contact part 515 and, then, after passing the contact part 515, abuts on the contact part 615 of the rotary arm 610, thereby turning the rotary arm 610.

When the operation rod 280 has abutted on the contact part 615 of the rotary arm 610, the gear 330 has already been removed from the gear train, and hence the slider bracket driving arm 610 may be turned with a very small force, causing the slider bracket 15 to slide this way.

Note that if the length from the shaft 420 (being the pivot of the rotary arm 610) to the rotatable coupler 613 is longer than the length from the shaft 420 to the contact part 615, it is possible to get the slider bracket 15 to slide an adequate distance of stroke by moving the contact part 615 by a very short stroke.

As the slider bracket 15 reaches its nearest position to the front, the support returns to the state of FIG. 2 (A). As the upper bracket 17 returns to this position, the recording medium 200 is released from the state of being latched by the latch assembly 59; therefore, the recording medium 200 is thrusted forwards by the force of the spring 51. Then, part of the recording medium is projected through the insertion port 260 of the front panel 250, permitting the operator to take out the recording medium 200.

After taking the recording medium 200 out of the information reproducing device, the support 100 is left in the initial insertion position of FIG. 2 (A). Then, as the operation rod 280 is drawn out through the insertion hole 270, the gear 330 is pressed down by the plate spring 450, to mesh respectively with neighboring gears 320 and 340, thereby restoring the gear train 455.

According to such an embodiment, since the gear 330 is removed from the gear train 455 when the slider bracket 15 is to be slid by means of the operation rod 280, the recording medium 200 may be taken out by getting the slider bracket 15 to slide with a very small force, even though the worm gear 310 is mounted on the output shaft of the drive 300.

Note that in the above embodiment, the slider bracket 15 is slid forwards by pushing in the contact part 615 of the rotary arm 610 by means of the operation rod 280, but depending on the direction of the slope of the inclined slots 37, sometimes the upper bracket 17 is moved to the initial insertion position from the reproduction position by getting the slider bracket to slide backward. In such an instance, it is proper to get the operation rod 280 to abut directly on the slider bracket.

Also, in the above embodiment, the removing operation of a transmission element (gear 330) by the retraction means 500 and the forcible moving operation of the slider bracket 15 can be concurrently performed, but the removing operation of the transmission element (gear 330) by the transmission element remover 500 and the forcible moving operation of the slider bracket 15 may be performed entirely separately, with two through-holes 270 provided through the front panel 250.

Further, in the above embodiment, the mover is provided by a through-hole 270, with the operation rod to be inserted into the interior of the device through this through-hole 270, although it may also be designed such that a member which functions similarly to the operation rod 280 is incorporated in the front panel 250 or in the cover member provided on the through-hole 270.

Still further, the transmission element which is removed from the transmission means 400 (gear train 455) is a gear in the above embodiment, but any type of gear, for example, a spur gear, bevel gear, or any one of many other gear types is usable, or according to the structure of the transmission means, any transmission element other than gears, like arms, cranks or belts, etc., may be specified as the transmission element.

Furthermore, in the above embodiment, the recording medium 200 is latched by the latch assembly 59, only when the slider bracket 15 causes the upper bracket 17 to slide backward by a relatively short distance from the initial insertion position. In other words, in so far as the upper bracket 17 remains in the initial insertion position, the recording medium 200 is not latched. On this account, as the upper bracket 17 is returned to the initial insertion position, the recording medium 200 is to be pushed out forwards through the insertion port 250 by the force of the spring 51. However, if, as different from the above embodiment, part of the recording medium is projected from the insertion port when the recording medium is loaded in the upper bracket in the initial insertion position, so that this projected part of the recording medium may be grabbed, it is easy to draw out the recording medium in defiance of the latching force, thus obviating the need of unlatching it at a certain sliding position of the upper bracket.

While the invention has been particularly shown and described with reference to preferred embodiments thereof, it will be understood by those skilled in the art that various changes in form and details may be made therein without departing from the spirit and scope of the invention:

What is claimed is:

1. An information reproduction apparatus comprising:
   supporting means for supporting a recording medium,
   drive means for driving said supporting means to move the recording medium between an initial insertion position and a reproduction position,
   a gear train for transmitting the driving force of said drive means to said supporting means, said gear train including a gear which is retractable therefrom,
   manually activated retraction means operable to force the gear to retract from said gear train and
   manually activated motion means operable to force the recording medium to move from the reproduction position to the initial insertion position after said retraction means has forced the gear to retract from said gear train.

2. An information reproduction apparatus as described in claim 1, wherein said motion means includes a through-hole provided in a front panel, said through-hole permitting an operation rod such as a pin, clip or a screw-driver, etc., for activating said motion means to move.

3. An information reproduction apparatus as described in claim 2, wherein both said retraction means and said motion means are so designed as to be driven by means of said operation rod.

4. An information reproduction apparatus as described in claim 1, wherein said motion means includes a rotary arm for transmitting a driving force.

5. An information reproduction apparatus as described in claim 4, wherein said motion means includes a through-hole provided in a front panel, said through-hole permitting an operation rod such as a pin, clip or a screw-driver, etc., for activating said motion means.

6. An information reproduction apparatus as described in claim 5, wherein both said retraction means and said motion means are so designed as to be driven by means of said operation rod.

7. An information reproduction apparatus comprising:
   supporting means for supporting a recording medium, a drive means for driving said supporting means to move the recording medium between an initial insertion position and a reproduction position,
   transmission means for transmitting the driving force of said drive means to said supporting means, said transmission means including a transmission element which is retractable therefrom,
   manually activated retraction means operable to force the transmission element to retract from said transmission means, and
   manually activated motion means including a rotary arm operable to force the recording medium to move from the reproduction position to the initial insertion position after said retracting means has forced the transmission element to retract from said transmission means.

8. An information reproduction apparatus as described in claim 7, wherein said motion means includes a through-hole provided in a front panel, said through-hole permitting an operation rod such as a pin, clip or a screw-driver, etc., for activating said motion means.

9. An information reproduction apparatus as described in claim 8, wherein both said retraction means and said motion means are so designed as to be driven by means of said operation rod.

* * * * *